United States Patent
Adachi (10) Patent No.: US 9,547,487 B2
(45) Date of Patent: Jan. 17, 2017

(54) IMAGE FORMING APPARATUS, CONTROL METHOD THEREFOR, AND CONTROL PROGRAM THEREFOR

(71) Applicant: CANON KABUSHIKI KAISHA, Tokyo (JP)

(72) Inventor: Tomoko Adachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 14/554,241

(22) Filed: Nov. 26, 2014

(65) Prior Publication Data

US 2015/0154014 A1 Jun. 4, 2015

(30) Foreign Application Priority Data

Dec. 3, 2013 (JP) ................................. 2013-250095

(51) Int. Cl.
*G06F 9/44* (2006.01)
*G06F 9/445* (2006.01)

(52) U.S. Cl.
CPC ....................................... *G06F 8/65* (2013.01)

(58) Field of Classification Search
CPC ........................................................ G06F 8/65
See application file for complete search history.

(56) References Cited

U.S. PATENT DOCUMENTS

| 2004/0148379 A1* | 7/2004 | Ogura | H04L 29/06 709/223 |
| 2004/0187103 A1* | 9/2004 | Wickham | G06F 8/65 717/168 |
| 2005/0256614 A1* | 11/2005 | Habermas | G06F 8/65 701/1 |
| 2009/0063612 A1* | 3/2009 | Hyo | H04N 1/00204 709/201 |
| 2009/0146980 A1* | 6/2009 | Nishikawa | G06F 8/60 345/205 |
| 2011/0167419 A1* | 7/2011 | Ishikawa | G06F 8/65 717/171 |

FOREIGN PATENT DOCUMENTS

JP     2007011944 A    1/2007

* cited by examiner

*Primary Examiner* — Philip Wang
(74) *Attorney, Agent, or Firm* — Rossi, Kimms & McDowell LLP

(57) ABSTRACT

An image forming apparatus capable of updating firmware appropriately. An update means obtains update firmware for updating the applied firmware, expands the update firmware, and applies the expanded update firmware to the image forming apparatus. A first determination means determines whether the update firmware is secure firmware. The update means performs the obtaining, the expansion, and the application sequentially, when the first determination means determines that the update firmware is secure firmware.

9 Claims, 8 Drawing Sheets

| CONTENTS LIST | |
|---|---|
| FIRMWARE TYPE | VERSION |
| FIRM TYPE=1 | 9.0 |

| MAIN CONTROLLER | |
|---|---|
| MODULE NAME | VERSION |
| OS | 0.90 |
| OPERATION UNIT | 0.90 |
| SCAN | 0.90 |
| PRINT | 0.90 |
| NETWORK | 0.90 |
| UPDATE | 0.90 |
| START PREPARATION | 0.90 |
| MAIN UPDATE | 0.90 |
| PROCESSING UNIT UPDATE | 0.90 |

| PRINTER UNIT PROGRAM | |
|---|---|
| DCOND | 0.90 |

FIG. 4B

| CONTENTS LIST | |
|---|---|
| FIRMWARE TYPE | VERSION |
| FIRM TYPE=1 | 9.1 |

| MAIN CONTROLLER | |
|---|---|
| MODULE NAME | VERSION |
| OS | 0.90 |
| OPERATION UNIT | 0.90 |
| SCAN | 0.90 |
| PRINT | 0.91 |
| NETWORK | 0.90 |
| UPDATE | 0.90 |
| START PREPARATION | 0.90 |
| MAIN UPDATE | 0.90 |
| PROCESSING UNIT UPDATE | 0.90 |

| PRINTER UNIT PROGRAM | |
|---|---|
| DCOND | 0.90 |

FIG. 4C

| CONTENTS LIST | |
|---|---|
| FIRMWARE TYPE | VERSION |
| FIRM TYPE=0 | 10.0 |

| MAIN CONTROLLER | |
|---|---|
| MODULE NAME | VERSION |
| OS | 10.0 |
| OPERATION UNIT | 10.0 |
| SCAN | 10.0 |
| PRINT | 10.0 |
| NETWORK | 10.0 |
| UPDATE | 10.0 |
| START PREPARATION | 10.0 |
| MAIN UPDATE | 10.0 |
| PROCESSING UNIT UPDATE | 10.0 |

| PRINTER UNIT PROGRAM | |
|---|---|
| DCOND | 10.0 |

FIG. 4D

| CONTENTS LIST | |
|---|---|
| FIRMWARE TYPE | VERSION |
| FIRM TYPE=0 | 10.1 |

| MAIN CONTROLLER | |
|---|---|
| MODULE NAME | VERSION |
| OS | 10.0 |
| OPERATION UNIT | 10.0 |
| SCAN | 10.0 |
| PRINT | 10.1 |
| NETWORK | 10.0 |
| UPDATE | 10.0 |
| START PREPARATION | 10.0 |
| MAIN UPDATE | 10.0 |
| PROCESSING UNIT UPDATE | 10.0 |

| PRINTER UNIT PROGRAM | |
|---|---|
| DCOND | 10.0 |

IMAGE FORMING APPARATUS, CONTROL METHOD THEREFOR, AND CONTROL PROGRAM THEREFOR

BACKGROUND OF THE INVENTION

Field of the Invention

The present invention relates to an image forming apparatus, a control method therefor, and a control program therefor. Particularly, the invention relates to an image forming apparatus that is capable of updating firmware, a control method therefor, and a control program therefor.

Description of the Related Art

An image forming apparatus in recent years is connectable with a network, and has functions, such as an image data storage function and a file service function that provides image data to a PC, that are equivalent to functions of computer equipment connected to a network, such as a PC and server equipment, in addition to an image print function and a transmission function. Computer equipment, such as a PC and server equipment, updates software including firmware through media, such as a network and a CD-ROM, in order to cope with security vulnerability and operation failure.

Firmware of an image forming apparatus is also updated in the same manner as computer equipment. However, altered firmware may be applied to an image forming apparatus in place of genuine firmware that a firmware vender provides at the time of updating the firmware. If altered firmware is applied to an image forming apparatus that is connected to a network, confidential information that the image forming apparatus concerned has may be revealed or unjust operation of the apparatus may be induced. Accordingly, firmware is necessary to be updated appropriately.

There is a known technique that encrypts genuine firmware downloaded via a network in order to update the firmware appropriately (for example, see Japanese Laid-Open Patent Publication (Kokai) No. 2007-11944 (JP 2007-11944A)).

However, when several hours pass after downloading the genuine firmware concerned until applying, for example, encryption of the genuine firmware downloaded via the network may be released by a third party who tries illegal access to the image forming apparatus. If encryption is released, there is a possibility that altered illegal firmware may be applied.

Moreover, even if firmware certified by the IEEE standard, which enhances a security function to prevent an operation by a third party, an illegal access to a network system, data alteration, an information, etc., is applied beforehand, firmware that is not certified by the IEEE standard may be applied due to an artificial mistake when it takes long time after downloading the firmware until applying, which may result in deterioration in the security function of the image forming apparatus.

SUMMARY OF THE INVENTION

The present invention aims to provide an image forming apparatus, a control method therefor, and a control program therefor, which are capable of updating firmware appropriately.

Accordingly, a first aspect of the present invention provides an image forming apparatus capable of updating applied firmware comprising an obtaining unit configured to obtain update firmware for updating the applied firmware, an expansion unit configured to expand the update firmware, an application unit configured to apply the expanded update firmware to the image forming apparatus at designated date and time when a user inputs a first instruction, and to apply the expanded update firmware in response to the expansion of the update firmware when the user inputs a second instruction, a determination unit configured to determine whether the update firmware is secure firmware, and a control unit configured to restrict an input of the first instruction, when the determination unit determines that the update firmware is secure firmware.

Accordingly, a second aspect of the present invention provides an image forming apparatus capable of updating applied firmware comprising an update unit configured to obtain update firmware for updating the applied firmware, to expand the update firmware, and to have at least two application units that apply the expanded update firmware to the image forming apparatus, a selection unit configured to select one of the at least two application units, and a determination unit configured to determine whether the update firmware to be applied is secure firmware. One of the at least two application units selected by the selection unit applies the expanded update firmware, when the determination unit determines that the update firmware is not secure firmware.

Accordingly, a third aspect of the present invention provides an image forming apparatus capable of updating applied firmware comprising an update unit configured to obtain update firmware for updating the applied firmware, to expand the update firmware, and to have at least two application units that apply the expanded update firmware to the image forming apparatus, a selection unit configured to select one of the at least two application units, and a determination unit configured to determine whether the applied firmware is secure firmware. One of the at least two application units selected by the selection unit applies the expanded update firmware, when the determination unit determines that the applied firmware is not secure firmware.

According to the present invention, firmware is able to be updated appropriately.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
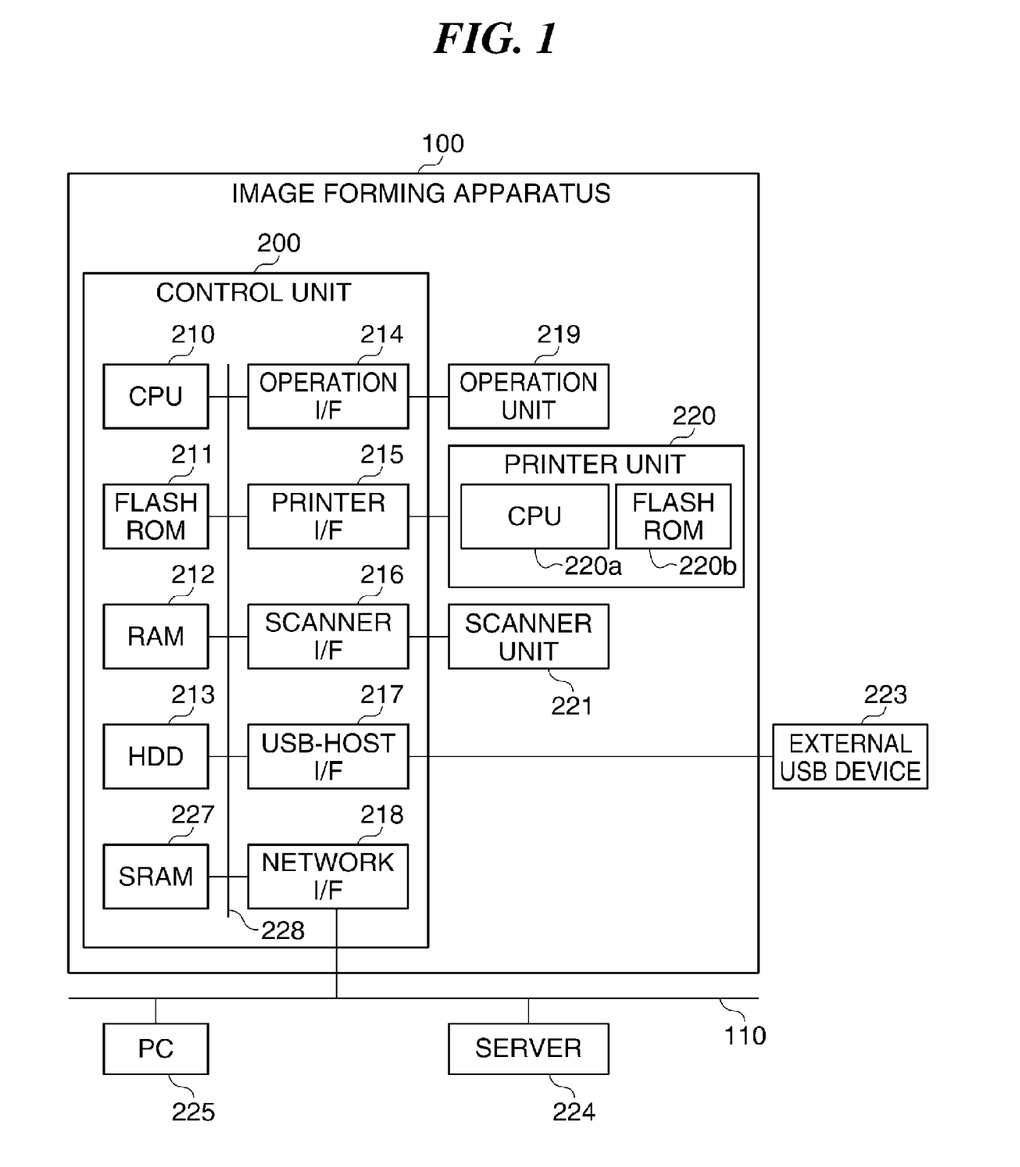
FIG. 1 is a block diagram schematically showing a configuration of an image forming system including an image forming apparatus according to an embodiment of the present invention.

FIG. 1 is a block diagram schematically showing a configuration of an image forming system including an image forming apparatus 100 according to an embodiment of the present invention.

The image forming system in FIG. 1 is provided with the image forming apparatus 100, an external USB device 223, a server 224, and a PC 225. The image forming apparatus 100, the server 224, and the PC 225 are mutually connected through a LAN 110. The external USB device 223 is connected to a USB-host I/F 217 mentioned later.

The image forming apparatus 100 is provided with a control unit 200, an operation unit 219, a printer unit 220, and a scanner unit 221.

The control unit 200 is provided with a CPU 210, a flash ROM 211, a RAM 212, an HDD 213, an operation I/F 214, a printer I/F 215, a scanner I/F 216, a USB-host I/F 217, a network I/F 218, and an SRAM 227, which are mutually connected through an internal bus 228.

The operation I/F 214, the printer I/F 215, the scanner I/F 216, and the network I/F 218 are connected to the operation unit 219, the printer unit 220, the scanner unit 221, and the LAN 110, respectively.

The operation unit 219 comprises a liquid crystal touch panel, for example. The printer unit 220 is provided with a CPU 220a and a flash ROM 220b. The CPU 220a prints a received image data on a paper sheet by running a program stored in the flash ROM 220b. The scanner unit 221 converts an image on an original read with a CCD line sensor into image data. The external USB device 223 is a USB memory or a USB keyboard, for example.

The CPU 210 controls the whole image forming apparatus 100 by reading the program stored in the flash ROM 211 to the RAM 212 and by running it. The HDD 213 stores print data obtained from the PC 225 and image data into which the print data is converted by running a print application program on the CPU 210 so that the printer unit 220 is able to output. Moreover, the HDD 213 stores image data that the scanner unit 221 reads by running a scan application program on the CPU 210.

The server 224 stores update firmware that is used to update the firmware that has been already applied to the image forming apparatus 100. The server 224 transmits the update firmware to the image forming apparatus 100 according to a request from the image forming apparatus 100. The PC 225 transmits print data like PDL data, which will be printed by the printer unit 220, to the image forming apparatus 100.

The SRAM 227 stores information about updates of programs (firmware) that are included in a main partition 401 and a subpartition 402 in FIG. 2 mentioned later. In addition, the SRAM 227 stores configuration information about configurations of devices, such as a printer, with which the image forming apparatus 100 is provided, state management information about states, such as versions of devices with which the image forming apparatus 100 is provided, and basic information about devices with which the image forming apparatus 100 is provided (for example, information about whether the printer is able to perform double-side printing). It should be noted that the configuration information, the state management information, and the basic information may be stored in the HDD 213.

Figure 2:
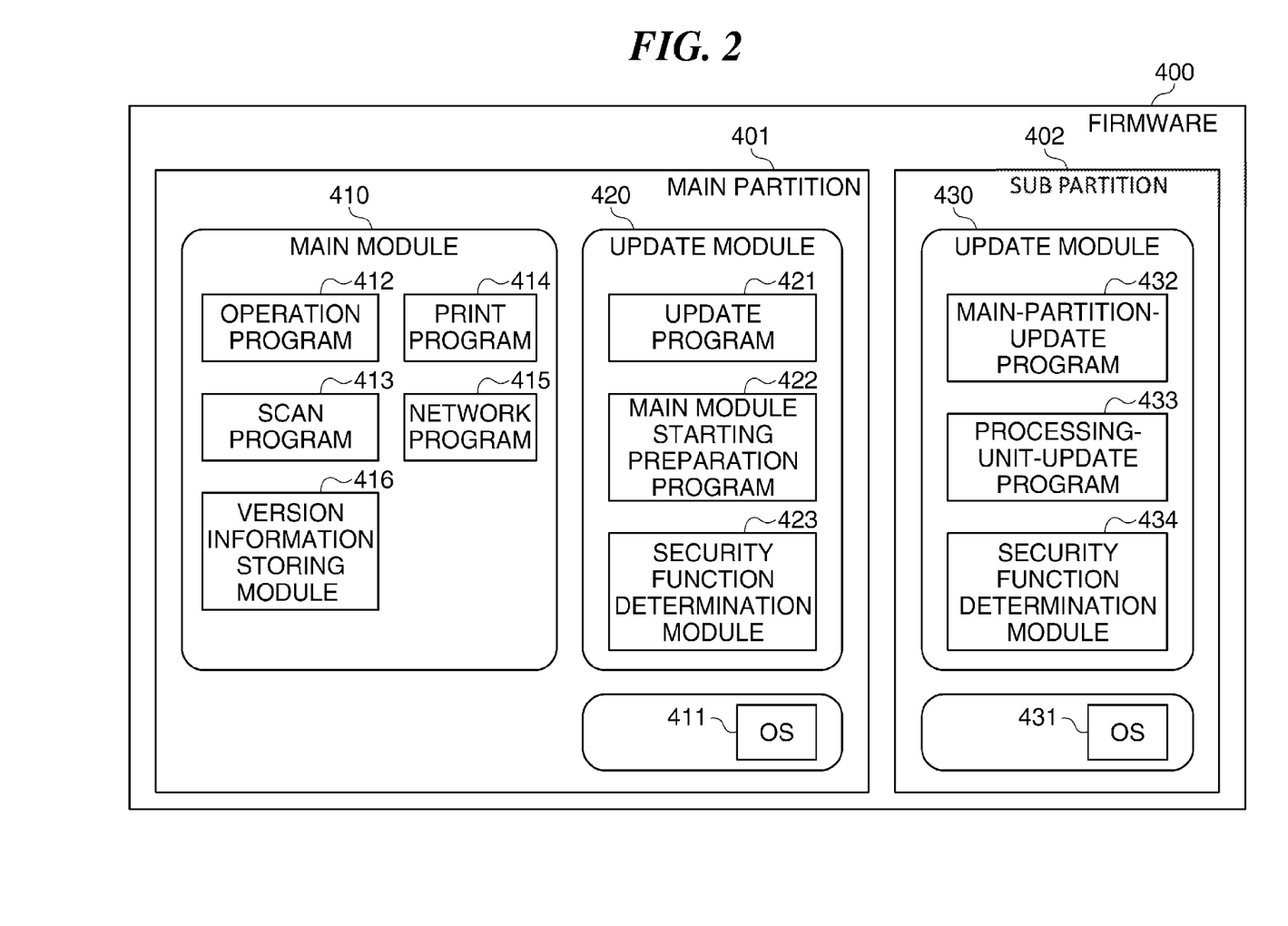
FIG. 2 is a block diagram schematically showing a configuration of firmware executed by the image forming apparatus shown in FIG. 1.

FIG. 2 is a block diagram schematically showing a configuration of firmware 400 executed by the image forming apparatus 100 shown in FIG. 1.

The firmware 400 in FIG. 2 consists of the main partition 401 and the subpartition 402 that are stored in the flash ROM 211.

The main partition 401 has three program modules of a main module 410, an operating system (referred to "OS", hereafter) 411, and an update module 420. The main module 410 has an operation program 412, a scan program 413, a print program 414, a network program 415, and a version information storing module 416. The update module 420 has an update program 421, a main module starting preparation program 422, and a security function determination module 423. Each program module of the main module 410 is executed by the OS 411 started.

The subpartition 402 has two program modules of an update module 430 and an OS 431. The update module 430 has a main-partition-update program 432, a processing-unit-update program 433, and a security function determination module 434, and each program module is executed by the OS 431 started.

The OS 411 and the OS 431 control the image forming apparatus 100, and contain driver programs for controlling operations of units like the printer unit 220 that the image forming apparatus 100 has. Moreover, the OS 431 is executed by the CPU 210 when updating each program module of the main partition 401.

The operation program 412 executes a process according to a user's instruction inputted into the image forming apparatus 100 through the operation unit 219. The scan program 413 executes the scan process that the scanner unit 221 reads an image on an original and converts it into image data. The print program 414 executes an output process that the printer unit 220 mentioned above prints an image on a paper sheet. The network program 415 communicates with the server 224 and the PC 225 that are connected to the image forming apparatus 100 through the LAN 110.

The version information storing module 416 stores the version information about the firmware applied to the main module 410. The version information about the firmware is displayed on the operation unit 219. The version information storing module 416 may be stored in not only the flash ROM 211 but the HDD 213 or the SRAM 227 degree.

The update program 421 updates programs included in the main partition 401 and the subpartition 402. The main module starting preparation program 422 performs an initialization process etc. that are required in order that the CPU 210 executes the main module 410. The security function determination module 423 determines whether the pre-update firmware and post-update firmware have security functions. It should be noted that firmware having a security function is referred to as secure firmware and that firmware having no or less security function is referred to as insecure firmware.

The sentence "firmware has a security function" means that the firmware concerned is enhanced in security in comparison with insecure firmware that is normally used and that is sufficient to exhibit a function. For example, the firmware that is certified by the IEEE standard corresponds to the firmware having a security function (secure firmware).

The main-partition-update program 432 updates each program included in the main partition 401. The processing-unit-update program 433 updates the program that is included in the flash ROM 220b and that executes the output process. The security function determination module 434 determines whether pre-update firmware and post-update firmware have the security functions in the same manner as the security function determination module 423.

Figure 3:
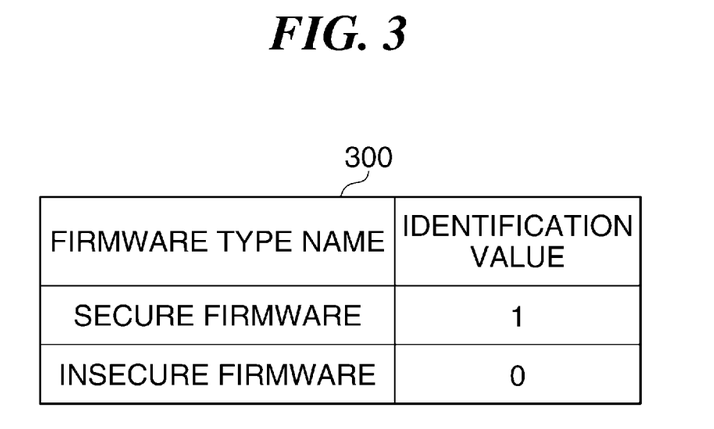
FIG. 3 is a view showing types of the firmware shown in FIG. 2.

FIG. 3 is a view showing types of the firmware 400 shown in FIG. 2.

As shown in FIG. 3, firmware-type information 300 that shows the configuration type of the firmware 400 in FIG. 2 consists of a firmware type name and an identification value, and that is stored in the version information storing module 416. In the firmware type name, the firmware type that shows the type of the firmware applied to the image forming apparatus 100 is described. There are insecure firmware and secure firmware as the firmware type, for example. The identification value is "0" that represents the insecure firmware or "1" that represents the secure firmware, and is included also in contents lists in FIG. 4A through FIG. 4D mentioned later.

Figure 4A:
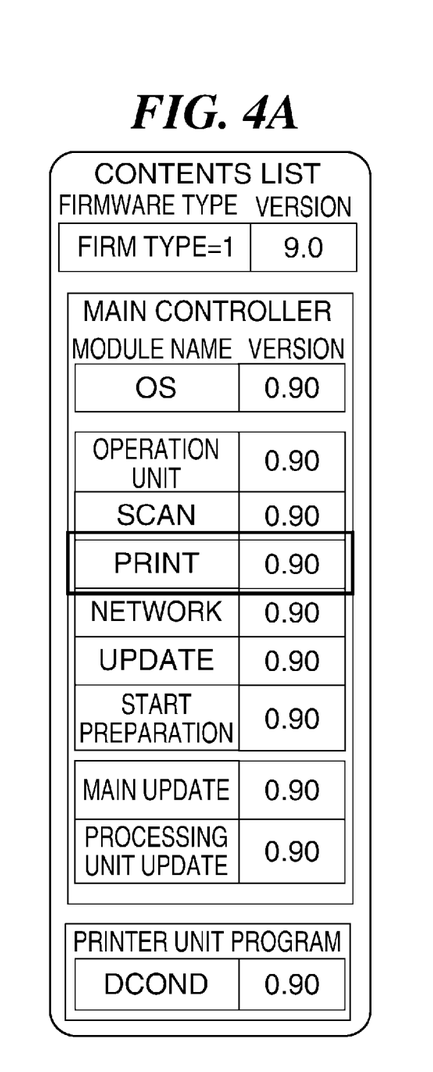
FIG. 4A shows an example of a contents list of the firmware shown in FIG. 2, and shows a contents list of pre-update secure firmware.
Figure 4B:
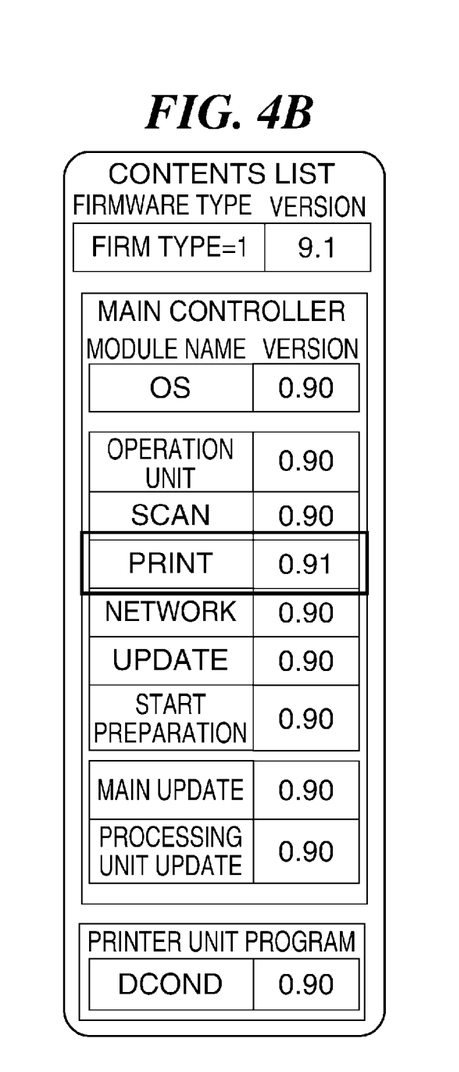
FIG. 4B shows an example of a contents list of the firmware shown in FIG. 2, and shows a contents list of post-update secure firmware.
Figure 4C:
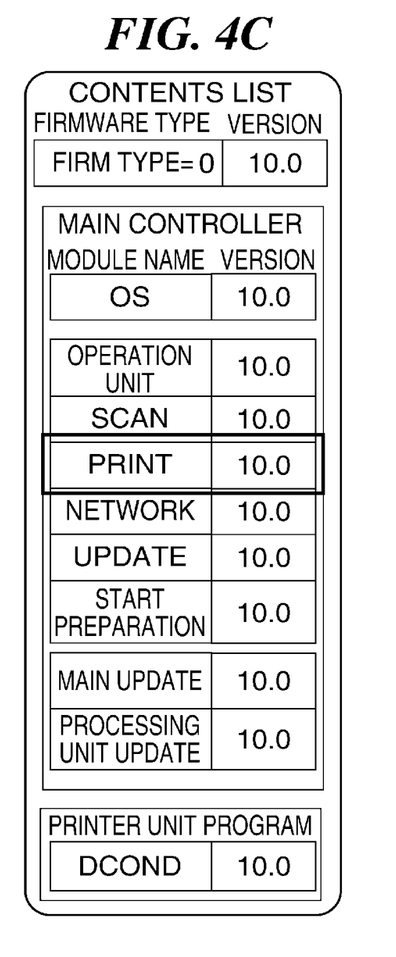
FIG. 4C shows an example of a contents list of the firmware shown in FIG. 2, and shows a contents list of pre-update insecure firmware.
Figure 4D:
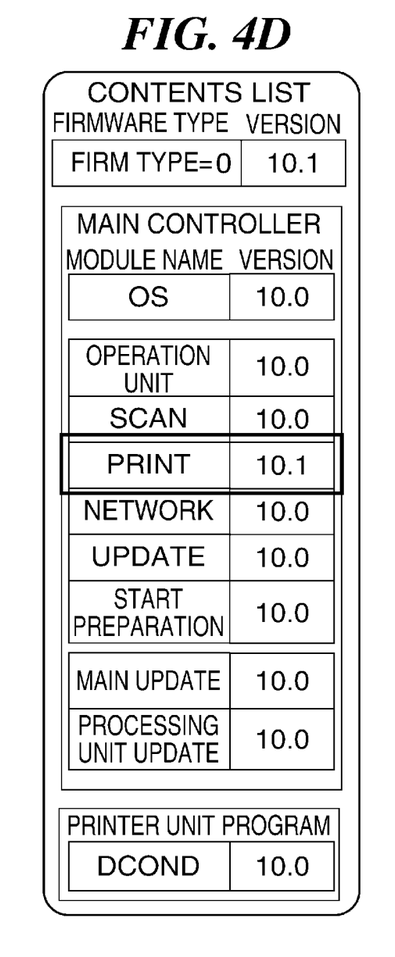
FIG. 4D shows an example of a contents list of the firmware shown in FIG. 2, and shows a contents list of post-update insecure firmware.

FIG. 4A through FIG. 4D are examples of contents lists of the firmware in FIG. 2. FIG. 4A shows a contents list of pre-update secure firmware. FIG. 4B shows a contents list of post-update secure firmware. FIG. 4C shows a contents list of pre-update insecure firmware. FIG. 4D shows a contents list of post-update insecure firmware.

The contents lists shown in FIG. 4A through FIG. 4D display plurality of pieces of firmware that the image forming apparatus 100 has and versions thereof. Moreover, the contents lists display the firmware types and versions of firmware packages that are aggregates of the plurality of pieces of firmware. The firmware type of the firmware package is displayed in a format of "FIRM TYPE=identification value ("0" or "1")".

In the contents list of the pre-update secure firmware and the post-update secure firmware in FIG. 4A and FIG. 4B, the versions of the firmware package are 9.0 and 9.1, and the versions of the print module are 0.90 and 0.91, respectively.

In the contents list of the pre-update insecure firmware and the post-update insecure firmware in FIG. 4C and FIG. 4D, the versions of the firmware package are 10.0 and 10.1, and the versions of the print module are 10.0 and 10.1, respectively.

For example, if the secure firmware corresponding to the contents list in FIG. 4A is updated by applying the insecure firmware corresponding to the contents list in FIG. 4D, the security function of the image forming apparatus 100 will deteriorate, which is not desirable. Accordingly, when the firmware is updated, the firmware type of the pre-update firmware needs to agree with the firmware type of the post-update firmware.

There are three methods for updating the firmware of the image forming apparatus 100, specifically.

In the first method, as an updater who updates the firmware, for example, an administrator of the image forming apparatus 100 immediately expands and applies update firmware downloaded from the external USB device 223, the server 224, or the PC 225 to update the firmware stored in the update program 421 (update execution).

The action of "the downloaded update firmware is immediately expanded and applied" means that the firmware update operation is performed by immediately and sequentially performing an operation concerning expansion of the update firmware mentioned below and an operation concerning application of the update firmware to eliminate any room for intervening an operation, such as an illegal access by a third party, that does not relate to the firmware update.

The action of "expansion of update firmware" means to apply the expansion process and decoding process to the downloaded firmware to which a compression process and an encryption process have been applied and to store it into a specific area of the flash ROM 211 etc. temporarily. Moreover, the action of "application of update firmware" means to store the expanded update firmware into the flash ROM 211.

In the second method, the firmware is updated at the following setup update timing in an unmanned state. An updater sets the distribution date-and-time of the update firmware and the rewriting date-and-time of the program area to the update module 420 as the update timings.

In the third method, the firmware is updated by applying the update firmware that is downloaded by an updater at the application date-and-time that is set to the update module 420 by the updater.

Figure 5:
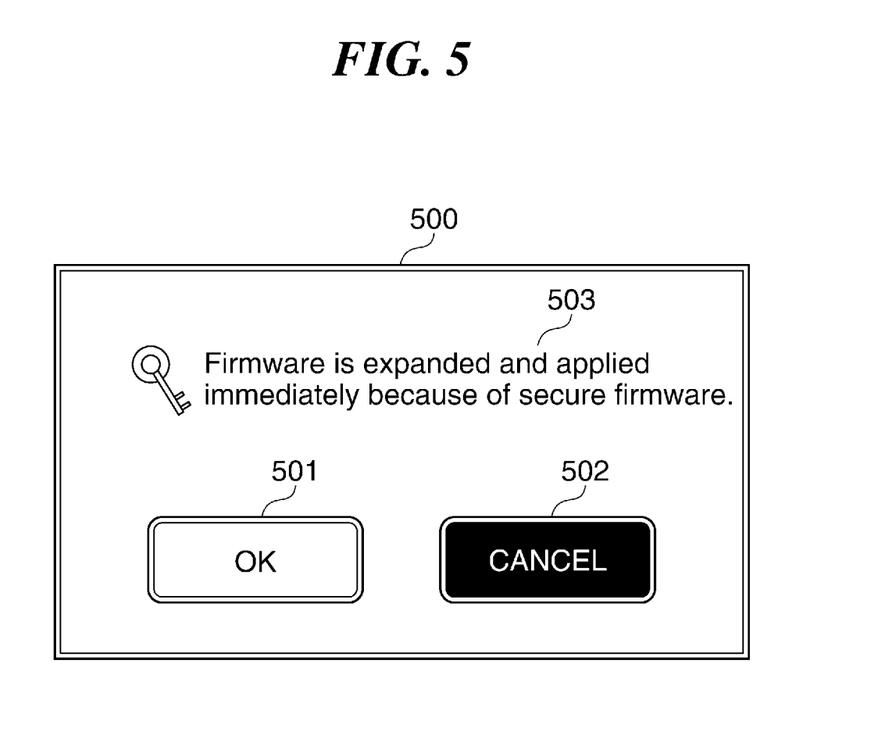
FIG. 5 is a view showing a screen displayed on an operation unit when updating the secure firmware.

FIG. 5 is a view showing a screen displayed on the operation unit 219 when updating the secure firmware.

An application ascertainment screen 500 for the update firmware in FIG. 5 is provided with an OK button 501, a cancel button 502, and a message 503.

When the OK button 501 in FIG. 5 is pushed, the update firmware is immediately expanded and applied. When the cancel button 502 is pushed, the download of the update firmware is canceled.

Figure 6:
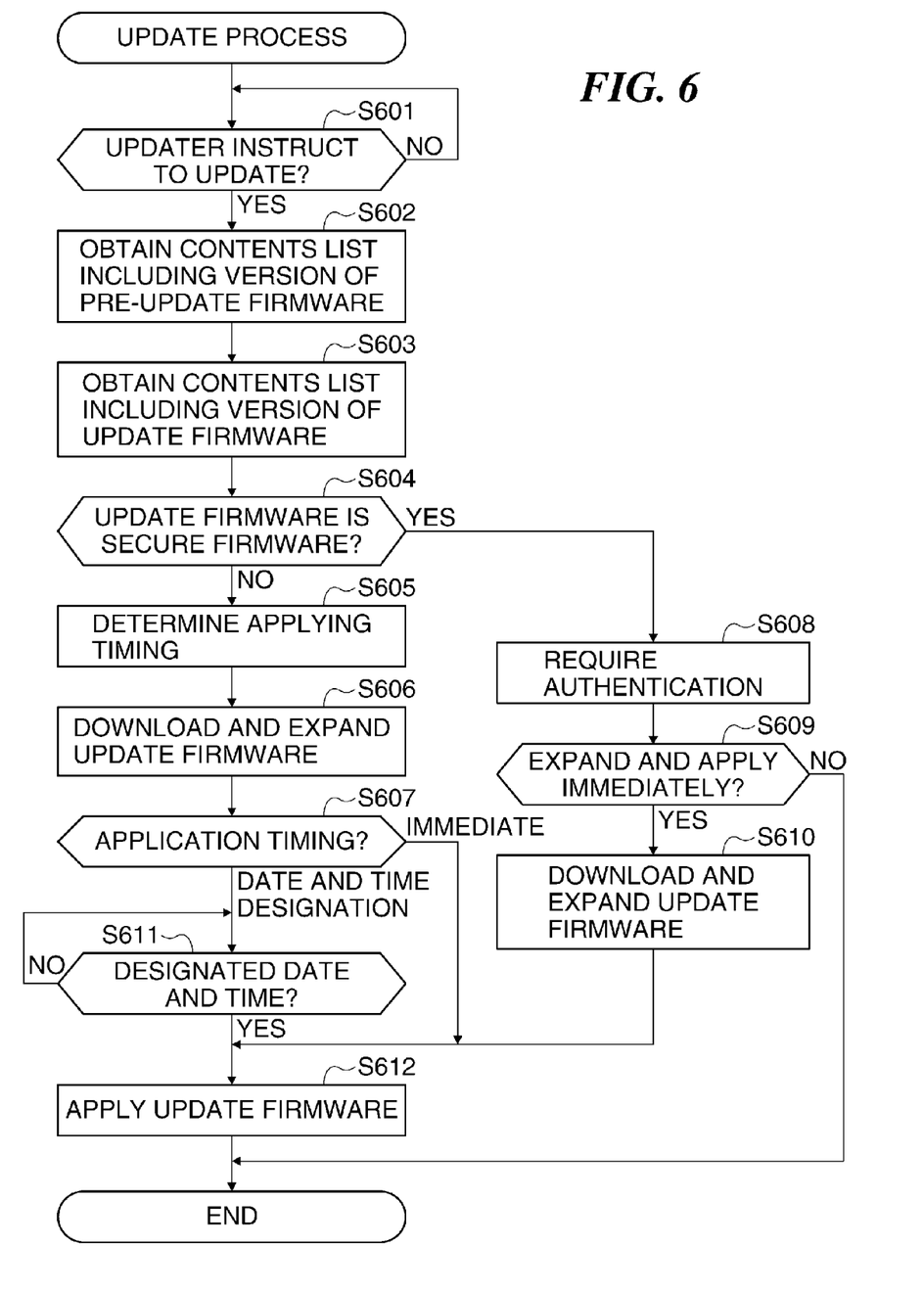
FIG. 6 is a flowchart showing procedures of an update process executed by the image forming apparatus shown in FIG. 1.

FIG. 6 is a flowchart showing procedures of an update process executed by the image forming apparatus 100 shown in FIG. 1.

The update process in FIG. 6 is executed when the CPU 210 of the image forming apparatus 100 controls the respective units of the control unit 200 according to the program stored in the flash ROM 211.

As shown in FIG. 6, when an updater instructs to update the firmware through the operation unit 219 of the image forming apparatus 100 (YES in step S601), the contents list including the version of the firmware (i.e., the pre-update firmware package) that is currently applied to the image forming apparatus 100 is obtained (step S602).

Next, the contents list that includes the version of the firmware package of the update firmware is obtained from the external USB device 223, the server 224, or the PC 225 (step S603). Then, it is determined whether the obtained update firmware is secure firmware (step S604).

As a result of the determination in the step S604, when the update firmware is secure firmware, the updater is required to authenticate to the image forming apparatus 100 (step S608), and it is determined whether the updater has set to immediately expand and apply the update firmware in response to the message 503 in FIG. 5 displayed on the operation unit 219 (step S609).

As a result of the determination in the step S609, when the updater has set to immediately expand and apply the update firmware, the update firmware is downloaded and is expanded immediately (step S610). Then, the update firmware concerned is applied immediately (step S612), and this process is finished. On the other hand, when the updater does not expand and apply the update firmware immediately, this process is finished without downloading the update firmware.

As a result of the determination in the step S604, when the update firmware is not secure firmware but insecure firmware, the timing at which the downloaded update firmware is applied is determined by the updater (step S605), and the update firmware is downloaded and expanded (step S606). Then, it is determined whether the application timing of the update firmware determined in the step S605 is date-and-time designation (a first instruction) or immediate application (a second instruction, step S607). It should be noted that the input of the first instruction is restricted (the case where NO is selected in the step S609), when the update firmware is secure firmware.

As a result of the determination in the step S607, when the timing at which the update firmware is applied is designated by date and time, the update firmware is applied (step S612) at the designated data and time (YES in the step S611), and this process is finished. On the other hand, when it is set that the update firmware will be applied immediately, the update firmware is applied immediately (step S612), and this process is finished.

According to the update process in FIG. 6, when the obtained update firmware is secure firmware (YES in the step S604), the update firmware downloaded to the image forming apparatus is immediately expanded and applied (step S610 and step S612). Namely, since the download of the update firmware to the image forming apparatus, the expansion of the downloaded update firmware, and the application of the expanded update firmware are merely performed in order, no time is given to a third party for altering the update firmware, which enables to certainly apply the update firmware that a user intends without being altered. As a result, the firmware is appropriately updated.

Moreover, a user may notice that the firmware applied to the image forming apparatus 100 is designed with excess security specification compared with what the user requires at the time when the user uses the image forming apparatus 100 for the first time. In such a case, the user would like to change the secure firmware to the insecure firmware.

Since the update process in FIG. 6 does not determine whether the pre-update firmware is secure firmware, insecure firmware of which the security is lower than the pre-update firmware is applicable. Accordingly, the firmware that agrees with the user's requirement is certainly applied to the image forming apparatus without being altered, even if the update of the firmware downgrades the security.

Figure 7:
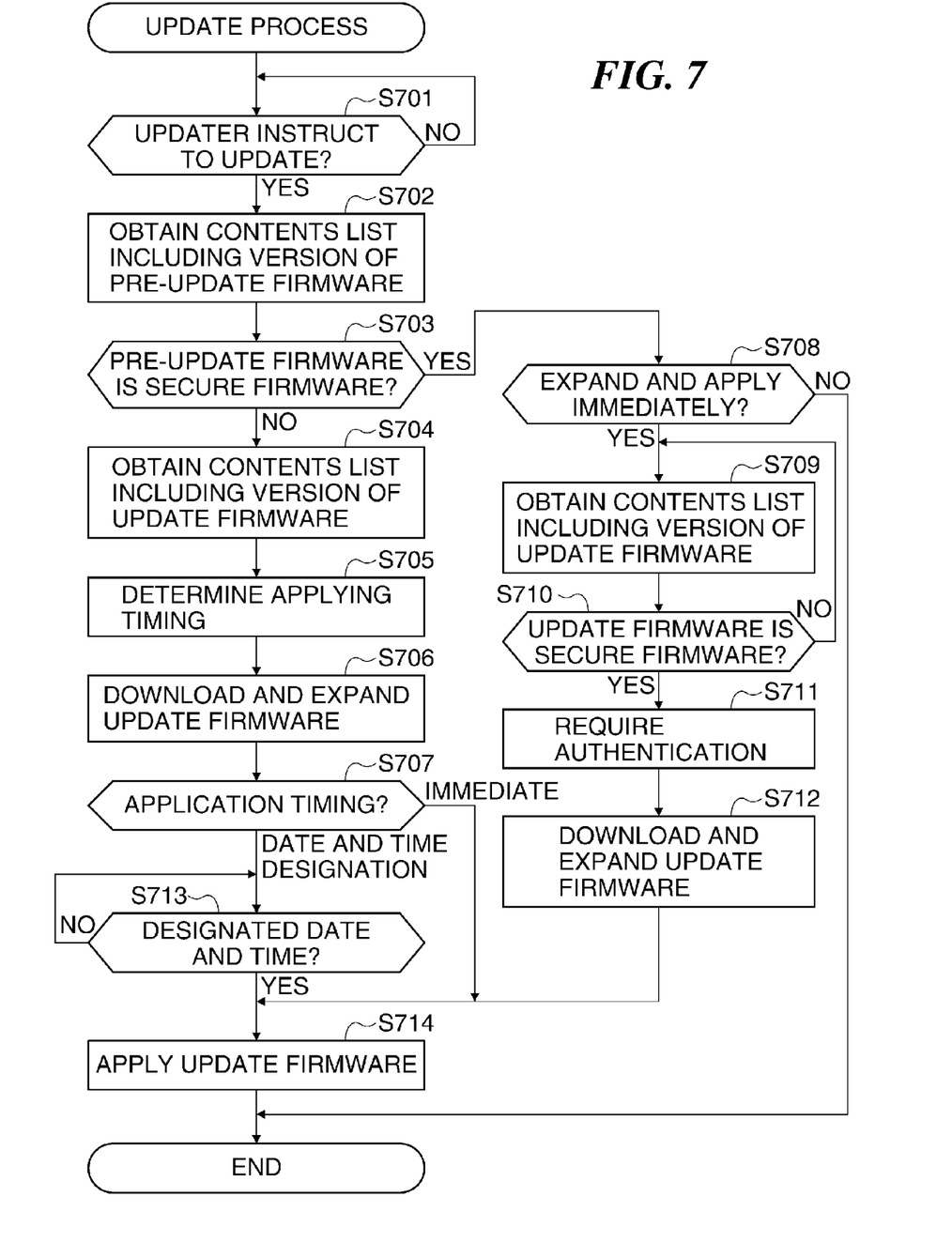
FIG. 7 is a flowchart showing procedures of a variation of the update process in FIG. 6.

FIG. 7 is a flowchart showing procedures of a variation of the update process in FIG. 6.

Since the procedures in steps S701, S702, S705, S706, S707, S712, S713, and S714 are identical to the procedures in the steps S601, S602, S605, S606, S607, S610, S611, and S612 in FIG. 6, respectively, the descriptions about these steps are omitted and only different points from the process in FIG. 6 will be described.

As shown in FIG. 7, the contents list that includes the version of the firmware that is currently applied (i.e., the pre-update firmware package) is obtained (step S702). Then, it is determined whether the pre-update firmware is secure firmware (step S703).

As a result of the determination in the S703, when the pre-update firmware is secure firmware, it is determined whether the updater has set to immediately expand and apply the update firmware in response to the message 503 in FIG. 5 displayed on the operation unit 219 (step S708).

As a result of the determination in the step S708, when the updater has set to immediately expand and apply the update firmware, the contents list that includes the version of the firmware package of the update firmware is obtained from the external USB device 223, the server 224, or the PC 225 (step S709). And when the update firmware is secure firmware (YES in the step S710), the updater is required to authenticate to the image forming apparatus 100 (step S711), the procedures in steps S712 and S714 are executed, and this process is finished.

On the other hand, as a result of the determination in the step S708, when the updater does not expand and apply the update firmware immediately, this process is finished without downloading the update firmware.

As a result of the determination in the step S703, when the pre-update firmware is not secure firmware, the contents list that includes the version of the firmware package of the update firmware is obtained from the external USB device 223, the server 224, or the PC 225 (step S704). Then, the procedures in and below the step S705 are executed, and the process is finished.

According to the update process in FIG. 7, when the pre-update firmware is secure firmware (YES in the step S703), and when the updater has set to immediately expand and apply the update firmware (YES in the step S708), the update process is executed. This enables to certainly apply the update firmware that the user intends to the image forming apparatus without being altered. In addition, careless update of the firmware that deteriorates the security is prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-250095, filed Dec. 3, 2013, which is hereby incorporated by reference herein in its entirety.

What is claimed is:

1. An image forming apparatus configured to update applied firmware, comprising:
a memory; and one or more processors configured to execute instructions that, when executed, cause the image forming apparatus to:

obtain update firmware for updating the applied firmware;

expand the update firmware;

determine whether the update firmware is secure firmware, wherein the secure firmware has a security function;

apply the expanded update firmware to the image forming apparatus at a designated date and time in a case where a user inputs a first instruction; and apply the expanded update firmware in response to the expansion of the update firmware in a case where the user inputs a second instruction, wherein in a case where it is determined that the update firmware is secure firmware, the user is restricted from inputting the first instruction.

2. The image forming apparatus according to claim 1, wherein the one or more processors are further configured to execute instructions to determine whether the applied firmware is secure firmware, and in a case where it is determined that the applied firmware is the secure firmware, apply the update firmware to the image forming apparatus by performing the obtaining, the expansion, and the application sequentially.

3. The image forming apparatus according to claim 1, wherein the one or more processors are further configured to execute instructions to expand the update firmware immediately after obtaining the update firmware, when performing the obtaining, the expansion, and the application sequentially.

4. An image forming apparatus configured to update applied firmware, comprising:

a memory; and one or more processors configured to execute instructions that, when executed, cause the image forming apparatus to:

obtain update firmware for updating the applied firmware;

expand the update firmware;

define at least two application timings to apply the expanded update firmware to the image forming apparatus;

select one of the at least two application timings; and determine whether the update firmware to be applied is secure firmware, wherein the expanded update firmware is applied at the selected application timing in a case where it is determined that the update firmware is not secure firmware.

5. An image forming apparatus configured to update applied firmware, comprising:

a memory; and one or more processors configured to execute instructions that, when executed, cause the image forming apparatus to:

obtain update firmware for updating the applied firmware;

expand the update firmware;

define at least two application timings to apply the expanded update firmware to the image forming apparatus;

select one of the at least two application timings; and determine whether the update firmware to be applied is secure firmware, wherein the expanded update firmware is applied at the selected application timing in a case where it is determined that the applied firmware is not secure firmware.

6. The image forming apparatus according to claim 4, wherein one of the at least two application timings causes the image forming apparatus to perform the obtaining, the expansion, and the application sequentially, and the other of the at least two application timings causes the image forming apparatus to apply the update firmware at a designated date and time.

7. A control method for an image forming apparatus configured to update applied firmware, the control method comprising:

obtaining update firmware for updating the applied firmware;

expanding the update firmware;

determining whether the update firmware is secure firmware, wherein the secure firmware has a security function;

applying the expanded update firmware to the image forming apparatus at a designated date and time when a user inputs a first instruction; and applying the expanded update firmware in response to the expansion of the update firmware when the user inputs a second instruction, wherein, in a case where it is determined that the update firmware to be applied is secure firmware, the user is restricted from inputting the first instruction.

8. A control program causing a computer to execute a control method for an image forming apparatus configured to update applied firmware, the control method comprising:

obtaining update firmware for updating the applied firmware;

expanding the update firmware;

determining whether the update firmware is secure firmware, wherein the secure firmware has a security function;

applying the expanded update firmware to the image forming apparatus at a designated date and time when a user inputs a first instruction; and applying the expanded update firmware in response to the expansion of the update firmware when the user inputs a second instruction, wherein, in a case where it is determined that the update firmware to be applied is secure firmware, the user is restricted from inputting the first instruction.

9. The image forming apparatus according to claim 5, wherein one of the at least two application timings causes the image forming apparatus to perform the obtaining, the expansion, and the application sequentially, and the other of the at least two application timings causes the image forming apparatus to apply the update firmware at a designated date and time.

* * * * *